US012657021B2

(12) United States Patent
Wang et al.

(10) Patent No.: US 12,657,021 B2
(45) Date of Patent: Jun. 16, 2026

(54) SCHEMA TRANSFORMATION FOR MANAGING AN APPLICATION BUILD

(71) Applicant: Oracle International Corporation, Redwood Shores, CA (US)

(72) Inventors: Jiun-Cheng Wang, San Jose, CA (US); Harish Santhanagopal, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 687 days.

(21) Appl. No.: 17/942,343

(22) Filed: Sep. 12, 2022

(65) Prior Publication Data

US 2024/0086184 A1     Mar. 14, 2024

(51) Int. Cl.
| | |
|---|---|
| *G06F 16/00* | (2019.01) |
| *G06F 8/36* | (2018.01) |
| *G06F 8/71* | (2018.01) |
| *G06F 16/21* | (2019.01) |
| *G06F 16/25* | (2019.01) |

(52) U.S. Cl.
CPC .................. *G06F 8/71* (2013.01); *G06F 8/36* (2013.01); *G06F 16/213* (2019.01); *G06F 16/258* (2019.01)

(58) Field of Classification Search
CPC .......... G06F 8/71; G06F 8/36; G06F 9/44526; G06F 16/258; G06F 16/213; G06N 20/20; G06N 7/01; G06N 5/01; G06N 3/084
See application file for complete search history.

(56) References Cited

U.S. PATENT DOCUMENTS

| | | | | |
|---|---|---|---|---|
| 9,047,358 B2 * | 6/2015 | Allman | ................ | G06F 16/273 |
| 9,600,269 B1 * | 3/2017 | Bregler | ................ | G06F 16/213 |
| 10,331,697 B2 * | 6/2019 | Allman | .................. | G06F 16/27 |
| 10,674,438 B2 * | 6/2020 | Bregler | ................ | H04W 48/16 |
| 10,891,305 B2 * | 1/2021 | Allman | .............. | G06F 16/2365 |
| 11,074,475 B2 * | 7/2021 | Coven | ........................ | G06F 8/60 |
| 2010/0153920 A1 * | 6/2010 | Bonnet | ..................... | G06F 8/36 |
| | | | | 717/122 |
| 2012/0005241 A1 * | 1/2012 | Ortel | ..................... | G06F 16/212 |
| | | | | 707/E17.005 |
| 2012/0221522 A1 * | 8/2012 | Allman | ................. | G06F 16/273 |
| | | | | 707/624 |

(Continued)

*Primary Examiner* — Jean M Corrielus
(74) *Attorney, Agent, or Firm* — Invoke

(57) ABSTRACT

Techniques for generating a schema transformation for application data to monitor and manage the application in a runtime environment are disclosed. A system runs an application plugin in a runtime environment to identify data generated by application modules in one or both of an application build process and an application execution process. The application plugin is a software program executed together with the application build process. The application plugin identifies a source schema associated with application data. The application plugin identifies a target schema associated with an analysis program or machine learning model. The application plugin generates a schema transformation to convert application runtime data into a target data set. The system applies the target data set to an analysis program, such as a machine learning model, to generate output analysis data associated with the application.

18 Claims, 7 Drawing Sheets

(56)  References Cited

U.S. PATENT DOCUMENTS

| | | | |
|---|---|---|---|
| 2015/0205852 A1* | 7/2015 | Allman | G06F 16/2365 |
| | | | 707/624 |
| 2015/0363436 A1* | 12/2015 | Cerasaro | G06F 16/2358 |
| | | | 707/803 |
| 2017/0147310 A1* | 5/2017 | Bregler | G06F 8/60 |
| 2017/0154072 A1* | 6/2017 | Cerasaro | G06F 16/213 |
| 2017/0286100 A1* | 10/2017 | Bregler | G06F 8/71 |
| 2017/0286139 A1* | 10/2017 | Chaney | G06F 9/44526 |
| 2017/0357648 A1* | 12/2017 | Fink | G06F 16/1873 |
| 2018/0203894 A1* | 7/2018 | Cerasaro | G06F 16/2358 |
| 2019/0007895 A1* | 1/2019 | Bregler | G06F 9/445 |
| 2019/0114160 A1* | 4/2019 | Yehuda | G06F 8/70 |
| 2019/0235883 A1* | 8/2019 | Chaney | G06F 8/71 |
| 2019/0266173 A1* | 8/2019 | Allman | H04L 67/02 |
| 2019/0361680 A1* | 11/2019 | Sanchez | G06F 8/30 |
| 2020/0004759 A1* | 1/2020 | Brebner | G06F 8/10 |
| 2020/0285977 A1* | 9/2020 | Brebner | G06F 8/76 |
| 2021/0133204 A1* | 5/2021 | Motamedi | G06F 16/282 |
| 2021/0133205 A1* | 5/2021 | Motamedi | G06F 16/258 |
| 2023/0109718 A1* | 4/2023 | Polen | G06F 16/211 |
| | | | 707/803 |
| 2023/0252233 A1* | 8/2023 | Gutierrez | G06F 40/40 |
| | | | 704/9 |

* cited by examiner

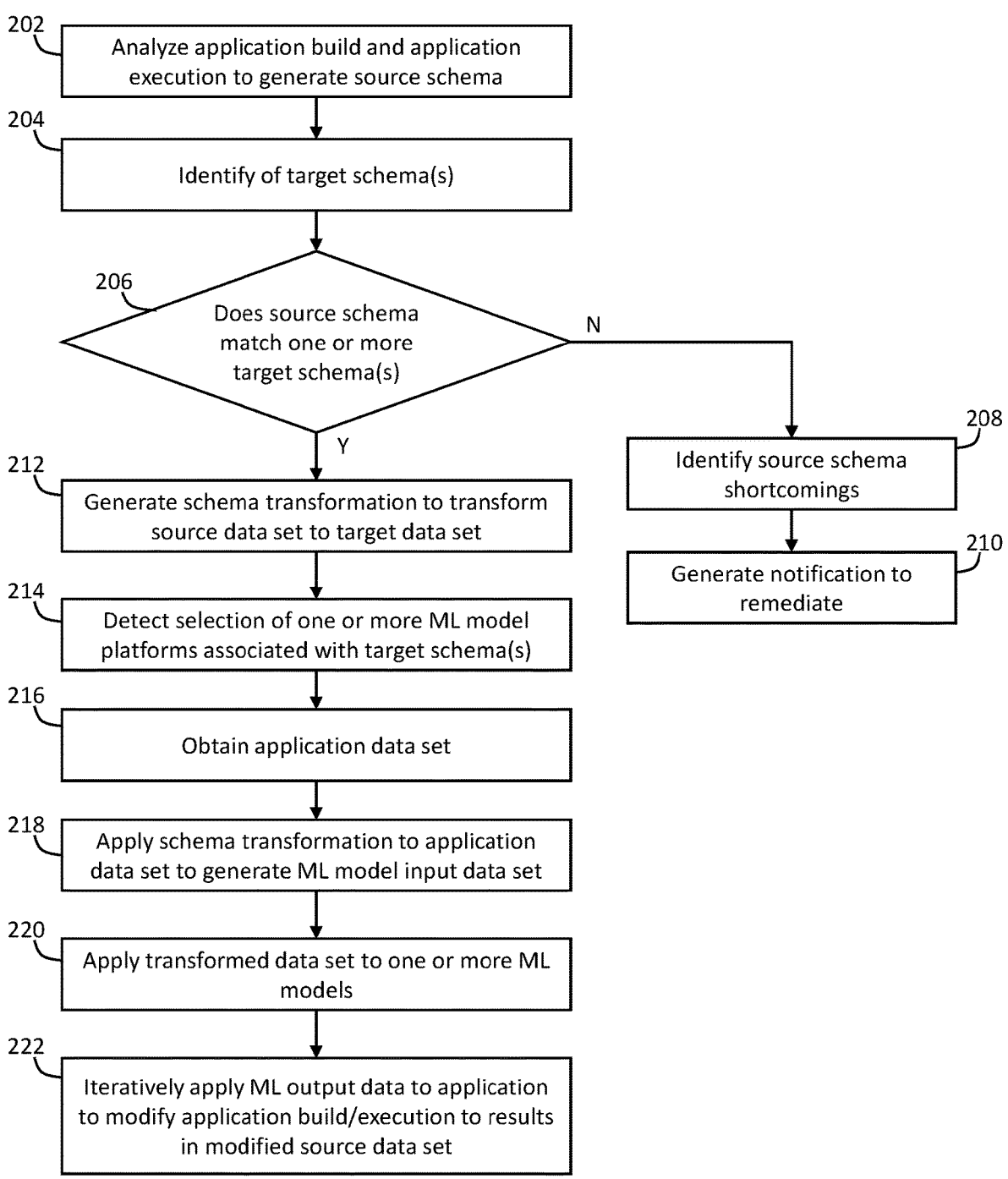

202   Analyze application build and application execution to generate source schema 204   Identify of target schema(s)

206   Does source schema match one or more target schema(s)

N

208   Identify source schema shortcomings

210   Generate notification to remediate

Y

212   Generate schema transformation to transform source data set to target data set 214   Detect selection of one or more ML model platforms associated with target schema(s)

216   Obtain application data set

218   Apply schema transformation to application data set to generate ML model input data set 220   Apply transformed data set to one or more ML models 222   Iteratively apply ML output data to application to modify application build/execution to results in modified source data set

Fig. 2

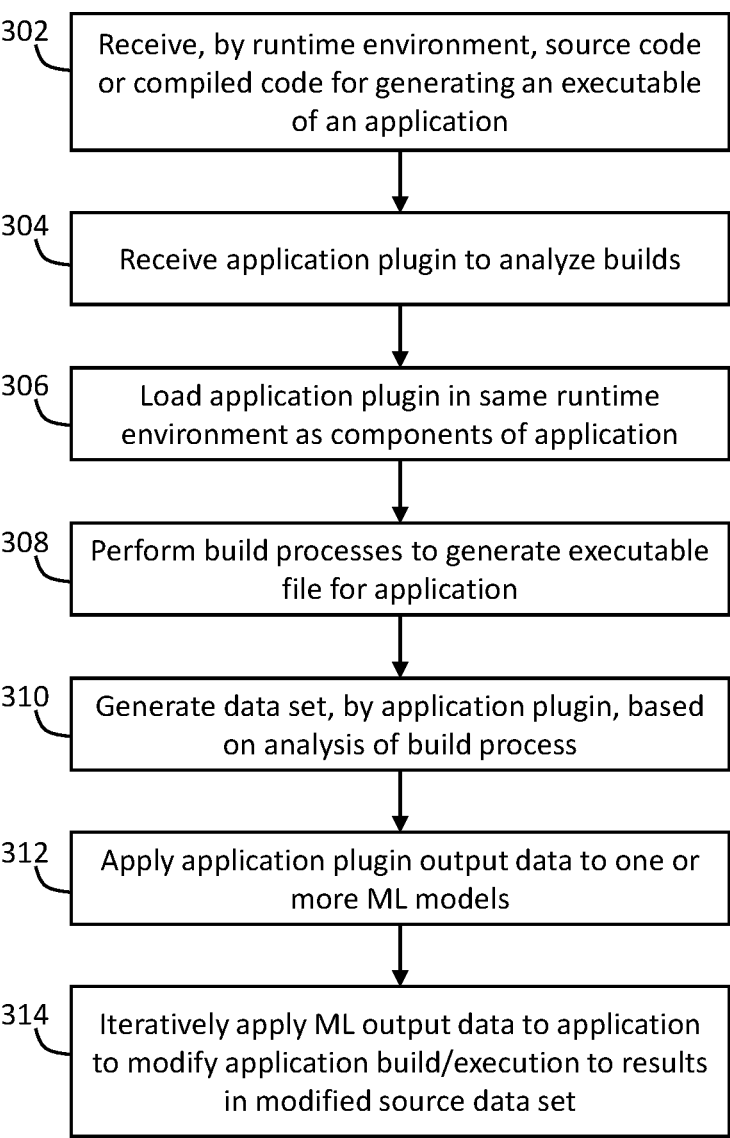

302   Receive, by runtime environment, source code or compiled code for generating an executable of an application 304   Receive application plugin to analyze builds 306   Load application plugin in same runtime environment as components of application 308   Perform build processes to generate executable file for application 310   Generate data set, by application plugin, based on analysis of build process 312   Apply application plugin output data to one or more ML models 314   Iteratively apply ML output data to application to modify application build/execution to results in modified source data set

Fig. 3

SCHEMA TRANSFORMATION FOR MANAGING AN APPLICATION BUILD

TECHNICAL FIELD

The present disclosure relates to monitoring and managing an application build and execution. In particular, the present disclosure relates to creating a schema transformation to convert data generated in one format associated with an application build and execution to another format for supplying to one or more machine learning models.

BACKGROUND

Many different platforms exist that allow users to build executable applications. Typically, a user generates source code. A build platform performs various build processes to convert the source code into one or more executable applications. For example, a build platform may execute build stages to compile, test, package, and deploy the source code. Different application build platforms generate and store data in different formats. For example, one platform may generate an application verification report containing ten verification results stored in a particular data format. Another platform may generate an application verification report, for the same underlying compiled code, containing twenty verification results stored in a different data format. Different application builds may be associated with hundreds of thousands, or millions, of lines of code, and may result in thousands of build logs, notifications, exceptions, artifacts, and reports. To obtain any actionable data from the logs, notifications, exceptions, artifacts, and reports, a user must identify which particular pieces of data correspond to data types and content that may be used by an analysis application to analyze the build process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of operations for generating a target data set based on a schema transformation in accordance with one or more embodiments;

FIG. 3 illustrates an example set of operations for monitoring a build and execution of an application using an application plugin in accordance with one or more embodiments;

DETAILED DESCRIPTION

Figure 1A:
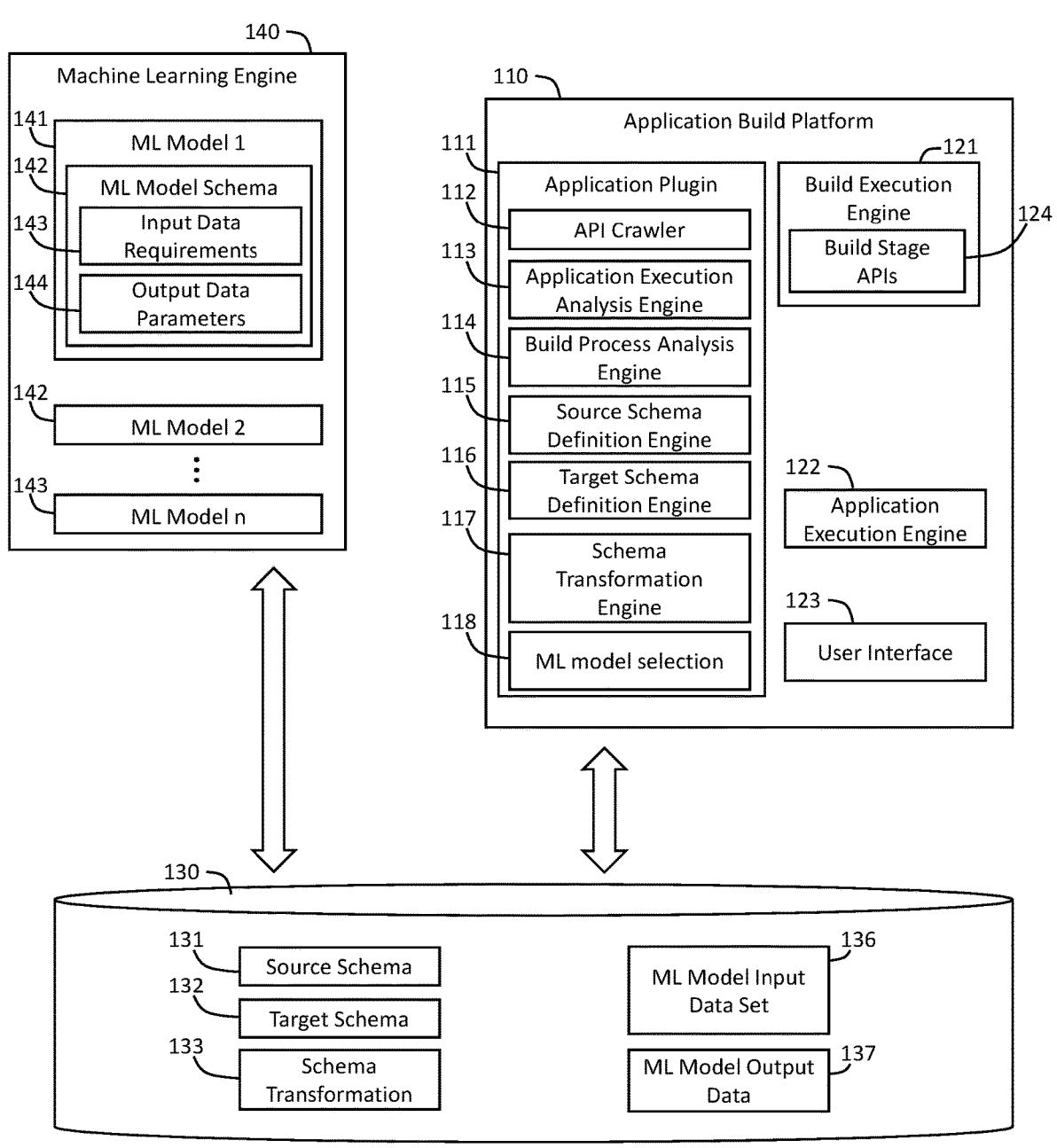
FIGS. 1A and 1B illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING TARGET DATA SET BASED ON A SCHEMA TRANSFORMATION
4. APPLICATION BUILD MONITORING WITH APPLICATION PLUGIN
5. EXAMPLE EMBODIMENTS
6. COMPUTER NETWORKS AND CLOUD NETWORKS
7. MISCELLANEOUS; EXTENSIONS
8. HARDWARE OVERVIEW

1. General Overview

An application build platform performs a series of build stage operations to convert pre-compiled code into an executable application. Each build stage may include an application programming interface (API) to allow a user or application to obtain data associated with the build phase. For example, an API function may result in the build platform generating a report regarding the success or failure of an application packaging build stage as well as any errors or exceptions generated during the application packaging build stage. However, the reports available from external-facing APIs may be insufficient for providing an analysis of the overall effectiveness of an application build.

One or more embodiments execute an application plugin in a runtime environment to identify characteristics of data generated by (a) application-internal modules and/or (b) application-external modules in one or both of an application build process and an application execution process. The application plugin is a software program executed together with the application build process. A system may load the application plugin in the runtime environment to monitor application processes. In addition, or in the alternative, the system may execute the application plugin in parallel with the runtime environment to monitor the application processes. The data generated by the application-internal modules includes data output by the application-internal modules during an execution of the application, as well as an execution state of the application-internal modules. The application-internal modules include hidden application programming interfaces (API's) that are not available to human users or other applications external to an application. For example, an application-internal module may include modules within a same security environment. The modules within the same security environment may exchange data without exposing the data to applications outside the security environment. Application-external modules include API's that are available to human users and other applications. The application plugin generates a schema transformation to map the data generated by the application with data required by one or more analysis programs, such as machine learning models.

As the application generates the data, the application plugin may transform the source data based on the schema transformation into a target data set having different formatting, size, sample rate, or other attributes. The application plugin may iteratively apply the target data set to a machine learning model to generate recommendations for modifying the executable application or the application build.

One or more embodiments obtain data from application-internal modules, transform the data according to a schema transformation, provide the transformed data to a machine learning model, and generate, using the machine learning model, one or more predictions or recommendations, without exposing the data from the application-internal modules to applications external to a particular security environment. For example, an application-internal module may generate data describing a set of exceptions associated with a particular location in memory. The application plugin may transform the data into an integer format with a different naming convention than the source name and without referencing a particular location in memory. The application plugin provides the transformed data to a machine learning model without exposing the source data to an external application.

One or more embodiments iteratively update a build process by (a) obtaining source data according to a source schema, (b) transforming the source data according to a schema transformation, (c) applying a resulting set of target data to an analysis engine, such as a machine learning model, to generate a recommendation, and (d) applying the recommendation to the build process to generate a new set of source data. The system may repeat the iterative process until a predefined threshold is met. For example, the system may repeat implementation of recommended modifications to a build process until a successive modification results in an improvement less than a defined threshold improvement.

One or more embodiments described in this Specification and/or recited in the claims may not be included in this General Overview section.

2. System Architecture

Figure 1B:
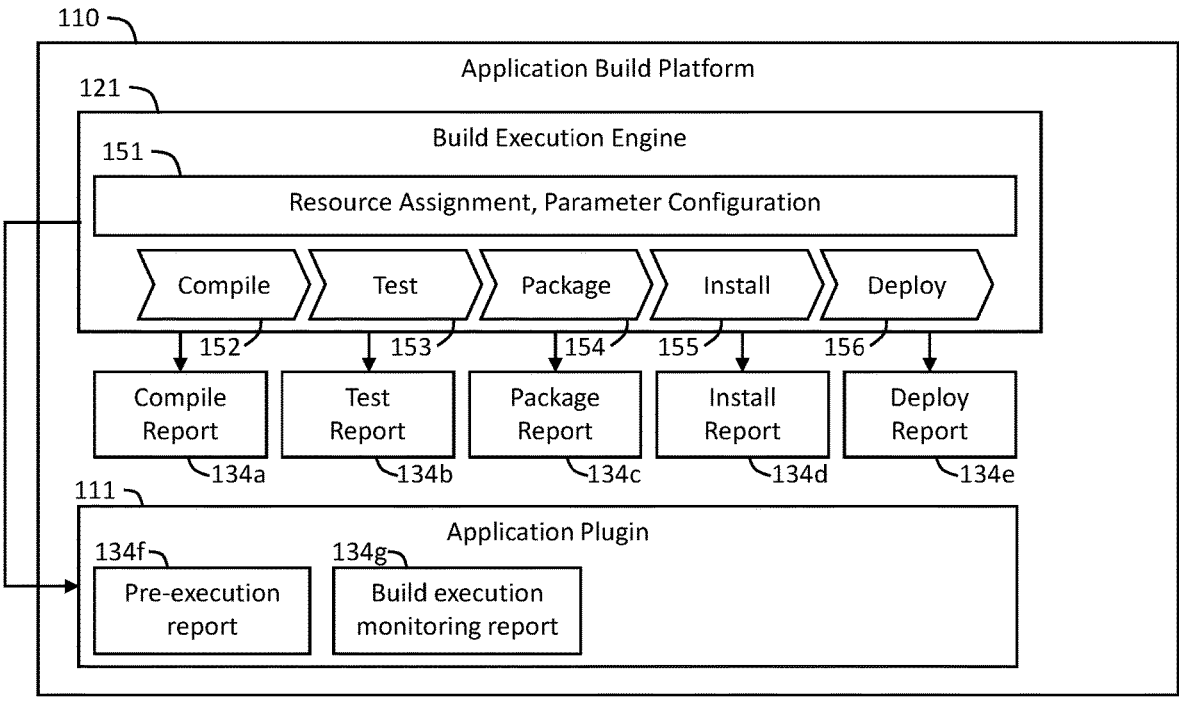

FIGS. 1A and 1B illustrate a system 100 in accordance with one or more embodiments. As illustrated in FIGS. 1A and 1B, system 100 includes an application build platform 110, a machine learning engine 140, and a data repository 130. In one or more embodiments, the system 100 may include more or fewer components than the components illustrated in FIGS. 1A and 1B. The components illustrated in FIGS. 1A and 1B may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The application build platform 110 includes a build execution engine 121 runtime environment which executes an application build. As illustrated in FIG. 1B, the build execution engine 121 includes software executed on hardware including one or more processors, to execute a sequence of build stages including resource assignment and build parameter configuration 151, compilation 152, testing 153, packaging 154, installation 155, and deployment 156. A system may interface with build stage application programming interfaces (APIs) 124 to generate a compile report 134a, a test report 134b, a packaging report 134c, an installation report 134d, and a deployment report 134e. The reports may include data associated with a success or failure of the stage, an execution state of the stage, a time taken to complete the build stage, and any errors or exceptions generated during the build stage.

The application build platform 110 further includes an application execution engine 122 to execute a version of the application. The execution may be part of a testing stage (153), a quality assurance stage, or a security test, for example.

In one or more embodiments, the application build platform 110 refers to hardware and/or software configured to perform operations described herein for identifying a source schema associated with an application, identifying a target schema associated with one or more machine learning models, generated a schema transformation, and applying the schema transformation to a source data set. Examples of operations for generating a target data set according to a schema transformation are described below with reference to FIG. 2.

In an embodiment, an application build platform is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

The application build platform 110 runs an application plugin 111. The application plugin 111 identifies data that may be collected in connection with an executable application (such as during the build process of the application and the execution of the application). The application plugin 111 includes an API crawler 112. The API crawler analyzes APIs associated with build stages (e.g., build stage APIs 124) to identify data obtainable by API calls. An application execution analysis engine 113 analyzes data generated by an application and by programs monitoring the application during execution of the application. A build process analysis engine 114 analyzes data generated by the build execution engine 121 during the application build process. A source schema definition engine 115 creates a source schema based on the data generated by the API crawler 112, the application execution analysis engine 113, and the build process analysis engine 114. The source schema definition engine 115 generates a source schema 131 by identifying (a) types of data, (b) data attributes, (c) quantities of data, and (d) data values that may be generated by one or more of build stage APIs 124, the build execution engine 121, and the application execution engine 122 during an application build and an application execution.

As illustrated in FIG. 1B, the application plugin 111 identifies data attributes of data generated prior to execution of build phases, during the execution of the build phases, and after execution of build phases. For example, the application plugin 111 may generated a pre-execution report 134f based on data generated prior to execution of a compilation build phase 152. The pre-execution report 134f may include data associated with resource assignments and build parameter configurations 151 that are configured and assigned prior to performing code compilation 152. Subsequent to compiling the application code (stage 152), the build execution engine 121 generates data that the application plugin 111 stores as a compile report 134a. The compile report may include, for example, names and attributes of data artifacts created, a success or failure of the code-compile operation, a time required to perform the operation, and errors or exceptions generated during compilation. The application plugin 111 may store a test report 134b, package report 134c, install report 134d, and deployment report 134e associated with data generated in each respective stage 153-156. In addition, the application plugin 111 may generate a build execution monitoring report 134g from data obtained during performance of the build stages 152-156. In other words, the reports 134a-134e may be generated after performance of the build stages 152-156 based on data output from the build execution engine 121 and logs generated during the build stages 152-156. The build execution monitoring report 134g may be generated while the stages 152-156 are in the process of being performed. For example, the application plugin 111 may monitor usage of a particular processing resource. The application plugin 111 may determine that the resource was utilized at a maximum rate of 10% during the packaging stage 154. Such a usage may not result in generating a log entry or an entry in the package report 134c. However, the application plugin 111 may include the usage rate in the build execution monitoring report 134g to determine whether to re-allocate an under-utilized resource.

A target schema definition engine 116 identifies (a) types of data, (b) data attributes, (c) quantities of data, and (d) data values that are required by one or more machine learning models 141-143 as input data to allow the ML models 141-143 to generate an output, such as a recommendation, a prediction, or a label.

In some examples, one or more elements of the machine learning engine 140 may use a machine learning algorithm to (a) analyze data associated with an executing application, (b) analyze data associated with build processes for building the executing application, and (c) generate one or more of (a) predictions, (b) recommendations, and (c) labels based on the application execution data and/or the application build data. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables (e.g., target product identifiers, target product descriptions, customer identifiers) for the target model f. The associated labels are associated with the output variable (e.g., substitute product identifiers, substitute product descriptions) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

A schema transformation engine 117 generates a schema transformation 133 by mapping a relationship between data attributes of required data in the target schema 132 with data attributes of available data in the source schema 131. For example, the schema transformation 133 may specify that a set of test results data having a name Test_ABC, a size of 10 kb, and a type "double float" is converted into a name TstABC, a size of 1 kb, and a type "integer" to correspond to a name requirement, a size requirement, and a type requirement of the target schema 132. As another example, the schema transformation 133 may specify that a set of time-series data having a particular sampling rate must be up-sampled to satisfy the requirements of the target schema 132.

The application plugin 111 includes a machine learning model selection 118 interface. A user or application may select one or more machine learning models for which to collect data. According to one embodiment, the ML model selection interface 118 includes an interface element of a graphical user interface (GUI) displayed by the user interface 123. In one or more embodiments, interface 123 refers to hardware and/or software configured to facilitate communications between a user and the application build platform 110. Interface 123 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 123 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 123 is specified in one or more other languages, such as Java, C, or C++.

The application plugin 111 may identify the target schema(s) 132 associated with the selected machine learning model(s) 118. Based on the identified target schema(s) 132, the application plugin performs a schema transformation to generate a machine learning model input data set 136. For example, the application plugin 111 may identify a machine learning model selection 118 corresponding to machine learning model 1 (141). The application plugin 111 may identify a schema 142 associated with the machine learning model 1 (141). The schema includes input data requirements 143 and output data parameters 144. The input data requirements 143 include the types, quantities, and attributes associated with data input to the machine learning model 1 (141) to generate output data in a format specified by the output data parameters 144. The system stores the machine learning model schema 142 as a target schema 132. The system identifies the type, quantity, and attributes of data generated by the build execution engine 121 and the application execution engine 122. The system stores the attributes and parameters of the available data as a source schema 131. The system generates a schema transformation 133 mapping the requirements specified in the target schema 132 with the data available as specified in the source schema 131. The system then transforms source data into the machine learning model input data set 136 using the schema transformation 133. The system applies the input data set 136 to the machine learning model 141 to generate output data 137, such as a prediction, recommendation, or labels.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the application build platform 110. Alternatively, or additionally, a data repository 130 may be implemented or executed on a computing system separate from the application build platform 110. A data repository 130 may be communicatively coupled to the application build platform 110 via a direct connection or via a network.

Information describing a source schema 131, target schema 132, schema transformation 133, machine learning model input data set 136, and machine learning model output data 137 may be implemented across any of components within the system 100. However, this information is illustrated within the data repository 130 for purposes of clarity and explanation.

Additional embodiments and/or examples relating to computer networks are described below in Section 6, titled "Computer Networks and Cloud Networks."

3. Generating Target Data Set Based on a Schema Transformation

FIG. 2 illustrates an example set of operations for using an application plugin to generate a dataset according to a target schema in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system analyzes one or both of an application build and an application execution to generate a source schema (Operation 202). The system may include an application plugin running in a run-time execution of the application. In addition, or in the alternative, the application plugin may run in a build platform during an application build process. Analyzing an application build includes analyzing application programming interface (API) functions of a build platform to identify metadata describing values returned by API functions and data types of the values. For example, the application plugin identifies types of data accessible by API functions, content contained in data returned by API functions, and an amount of data returned by API functions. In one or more embodiments, the system identifies data attributes associated with values returned by API functions including: a name of an artifact created by an API function, a type of data artifact, a number of times data artifacts of a particular type are generated, a size of an artifact, and content associated with data returned by an API function. Analyzing the application execution includes identifying data attributes of data generated by the executing application.

According to one or more embodiments, analyzing an application build includes identifying resources assigned to build operations associated with stages of the application build. For example, the application plugin running in a build platform may monitor a number of processing threads assigned to compiling particular portions of the application or assigned to test portions of the application. The application plugin may monitor usage rates of assigned resources, and start and stop times of different build stages and of tasks within build stages, and of assigned resources. The application plugin may also monitor and analyze results reports associated with stages of the application build.

According to one or more embodiments, the application plugin analyzes application-internal modules to detect characteristics of data generated by the application-internal module. An application-internal module is a module of the application that generates data to be consumed by one or more additional modules internal to the application. The data generated by the application-internal module may not be output to a user or another application or device external to the application monitored by the application plugin. In one or more embodiments, analyzing an application-internal module includes traversing a private API of the application-internal module that is accessible to other application-internal modules, but is not available to external users, applications, or devices.

According to one or more embodiments, the application plugin analyzes the application-internal module in different states, such as states of a build process. For example, the application plugin may analyze data values generated associated with the application-internal module during a compile stage of a build process, a test stage of the build process, a package stage of the build process, an install stage of the build process, and a deployment stage of the build process.

The system identifies one or more target schemas (Operation 204). A target schema may be associated with a machine learning model. For example, one target schema may specify requirements for a data set (e.g., a minimum/maximum number of data points, types of data, organization of different types of data in each data set, data formatting requirements) to be applied to one machine learning model. A different machine learning model associated with a different target schema may have different requirements for an input data set.

Identifying a target schema may include analyzing an API associated with a machine learning model to identify descriptions of data attributes required for a data set to be input to the machine learning model. In addition, or in the alternative, identifying the target schema may include analyzing a published specification associated with a machine learning model to identify requirements for data sets to be input to the machine learning model.

According to one embodiment, the application plugin stores a set of target schemas which specify requirements for a data set that could be provided as an input data set to two or more machine learning models. For example, three machine learning models may include a set of the same five data attributes. One of the machine learning models may require one additional data attribute. Another of the machine learning models may require yet an additional data attribute. The set of target schemas may specify seven data attributes which, if a set of source data included each of the seven data attributes, could be applied as an input data set to any of the three machine learning models.

The machine learning models may be implemented on the same platform or on different platforms. The application plugin may analyze different machine learning models on different platforms to identify target schemas. Examples of platforms two which the application plugin may communicate to run a machine learning model include MATPLOTLIB, PLOTLY, NATURAL LANGUAGE TOOLKIT, PANDAS, SCIKIT-LEARN, SEABORN, KERAS, SCIPY, PYTORCH, and TENSORFLOW.

According to one embodiment, the application plugin includes functionality to generate a graphical user interface (GUI). The GUI may display a list of machine learning models. Selection, by a user, of a ML model from the list may cause the application plugin to obtain from memory a target schema associated with the selected ML model.

The system determines whether the source schema matches one or more target schemas (Operation 206). For example, the application plugin may identify in the source schema a sequence of 100 measurements associated with a processing metric. The measurements may be associated with a name, a data type, and a formatting type. The application plugin may identify in a target schema a requirement for at least 100 data points associated with the data type. The target schema may require the data points be of the same data type, but in a different format. The application plugin may determine based on (a) the type of data, and (b) the quantity of data that the source schema matches the target schema. In an example in which the target schema specifies requirements for an input data set for a machine learning model, the application plugin may determine that the source data set may be provided to the ML model to generate a set of predictions associated with the application.

If the system determines that the source schema does not match one or more target schemas, the system identifies one or more shortcomings of the source schema (Operation 208). For example, the application plugin may determine that the target schema requires a predetermined number of data samples and the source schema would not provide the required number of data samples. In addition, or in the alternative, the application plugin may determine that the source schema specifies data of a different type than is required by the target schema.

The system generates a notification to remediate the shortcomings (Operation 210). For example, a notification may include a recommendation to add functionality to an application to generate a particular type of data to match the target schema(s). In addition, or in the alternative, the notification may recommend increasing a quantity of data of a particular type.

If the system determines that the source schema matches one or more target schemas, the system generates a schema transformation to transform source data into a form compatible with the target schema (Operation 212). The schema transformation may include generating a set of rules. The set of rules may specify attributes of source data and attributes of target data. The set of rules may specify which source data matches which target data and whether any modification is required to transform the source data into the target data. Modifications may include: renaming data, resizing data, and reformatting data. Reformatting data may include, for example, changing a data type associated with the data (such as changing among integers, floats, doubles, shorts, longs, Booleans, and characters). The set of rules may be stored, for example, as a table or set of tables specifying a schema transformation.

The system detects the selection of one or more machine learning models associated with one or more target schemas (Operation 214). For example, the application plugin may display a window in a GUI providing a list of machine learning models. One or more of the machine learning models may be associated with different platforms. The application plugin may detect a user selection of one or more of the machine learning models. In addition, or in the alternative, the system may select one or more machine learning models based on default application settings, such as default settings for quality assurance of an application build process. For example, an administrator or operator may configure an application plugin to perform one type of machine learning analysis for one type of application build and another type of machine learning analysis for another type of application build.

According to one example, the application plugin may display machine learning models for which a schema transformation have been identified distinctly from machine learning models for which schema transformations have not been identified. For example, if the system determines that a set of source data associated with the application matches attributes of data required by two machine learning models from a list of six machine learning models, the application plugin may display the two machine learning models in a GUI as highlighted compared to the remaining four machine learning models on the list.

Based on the selection of the machine learning model(s), the system obtains an application data set to be applied to a selected machine learning model (Operation 216). The application data set may include one or both of runtime application data and build data obtained in the application build process. The system obtains the application data set based on schema transformations associated with selected machine learning models. For example, if the system determines that a selected machine learning model requires values for a particular set of data attributes, the system identifies the particular set of data attributes in a schema transformation. The system identifies the corresponding set of attributes generated by a monitored application.

The system applies the schema transformation to the application data set to generate a target data set compatible with the selected machine learning model(s) (Operation 218). Applying the schema transformation includes retrieving stored data, renaming data, resizing data, and reformatting data. For example, the system may retrieve a set of data attribute values from a data object having a first name. The system may store the data attribute values in another data object having a different name. The system may identify a set of data values corresponding to time-series data taken at a first time interval. The system may identify, based on the schema transformation, that a target data set requires the data attribute values at a second time interval larger than the first time interval. The system may filter the source data values to obtain a set of data values having time intervals specified by the schema transformation. The system may identify a set of values having a float-type. The system may identify, based on the schema transformation, that a target model requires data of an integer-type. The system may convert the set of values from float-type to integer type and save the set of values in a particular data object.

The system applies the target data set to the selected machine learning model(s) (Operation 220). For example, the system may convert a set of data into one or more input vectors. The system may apply the input vectors to the machine learning model to generate one or more predictions, calculations, and/or labels.

The system and/or a user may modify characteristics and parameters of the application based on the results generated by the machine learning model(s) (Operation 222). For example, an application plugin may monitor an application build process. The application plugin may identify values associated with processing threads assigned to tasks at a compile stage of the process. The application plugin generates an input to a machine learning model which includes values representing, for a particular set of tasks: resources assigned, start times, end times, success or failure, and whether any exceptions or errors occurred. The machine learning model generates output values representing recommended sets of resources to perform the compilation operation for the application.

The system iteratively modifies the application based on repeatedly (1) obtaining a data set based on application execution and/or build data, (2) applying the data to a machine learning model, and (3) modifying attributes and/or parameters of the application and/or application build based on the output generated by the machine learning model, to generate a new data set. The system may iteratively modify the application and/or application build until a measured performance change reaches a threshold. For example, iteratively modifying application attributes and/or parameters may result in improvement changes of 14%, 8%, and 3%, respectively. The system may refrain from performing additional iterations based on determining that the improvement change to further modify the application is less than 5%.

4. Application Build Monitoring with Application Plugin

FIG. 3 illustrates an example set of operations for obtaining a data set describing an application build using an application plugin which executes together with the application build in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system receives, by a runtime environment, source code or compiled code for generating an executable of an application (Operation 302). The runtime environment is an application build environment that executes one or more of a compile process, a post-compile test process, an application package process, an application install process, and an application deployment process.

The system receives an application plugin to analyze application builds (Operation 304). The application plugin runs on the application build platform to provide functionality to the application build platform to (a) identify and collect data generated during a build process, and (b) transform the data into a schema corresponding to a selected target schema.

The system loads the application plugin in a same runtime environment as the components of the application (Operation 306). For example, the system may execute the plugin while the system executes compile operations of the application build platform.

The system performs the build process to generate the executable file for the application (Operation 308). The build process may include one or more of a compile stage of a build process, a test stage of the build process, a package stage of the build process, an install stage of the build process, and a deployment stage of the build process. According to one example, the build process may include a security test process to test security settings and compliance of an application with reference to a particular standard.

The application plugin generates a data set based on analysis of the build process (Operation 310). For example, the application plugin may identify in a schema transformation a set of data values associated with twenty data attributes required by a target schema. The set of data values may include values associated with (a) resources assigned to tasks of an application test process, (b) success/fail results of the tests, (c) and a time taken by the resources to perform the tasks. The system may generate the data set by obtaining data associated with resources assigned to tasks from operations data, a time taken by resources to perform the tasks from log data, and success/fail results from test completion reports.

The system applies the application plugin data set to one or more machine learning models (Operation 312). For example, the system may convert a set of data into one or more input vectors. The system may apply the input vectors to the machine learning model to generate one or more predictions, calculations, and/or labels. The machine learning models may include user-selected machine learning models or pre-assigned machine-learning models.

The system iteratively modifies parameters of the build based on the machine learning model output data, to generate a new data set to apply to the machine learning models (Operation 314). In the example embodiment in which the data set includes (a) resources assigned to tasks of an application test process, (b) success/fail results of the tests, (c) and a time taken by the resources to perform the tasks, the machine learning model may make a recommendation to re-assign resources among the tasks. The build platform reconfigures assignment of resources among the tasks and re-performs the build process with the reconfigured resource assignments. The application plugin generates a new set of data based on the repeated build process, provides the data to the machine learning model, and obtains a new recommendation from the machine learning model.

5. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

Figure 4:
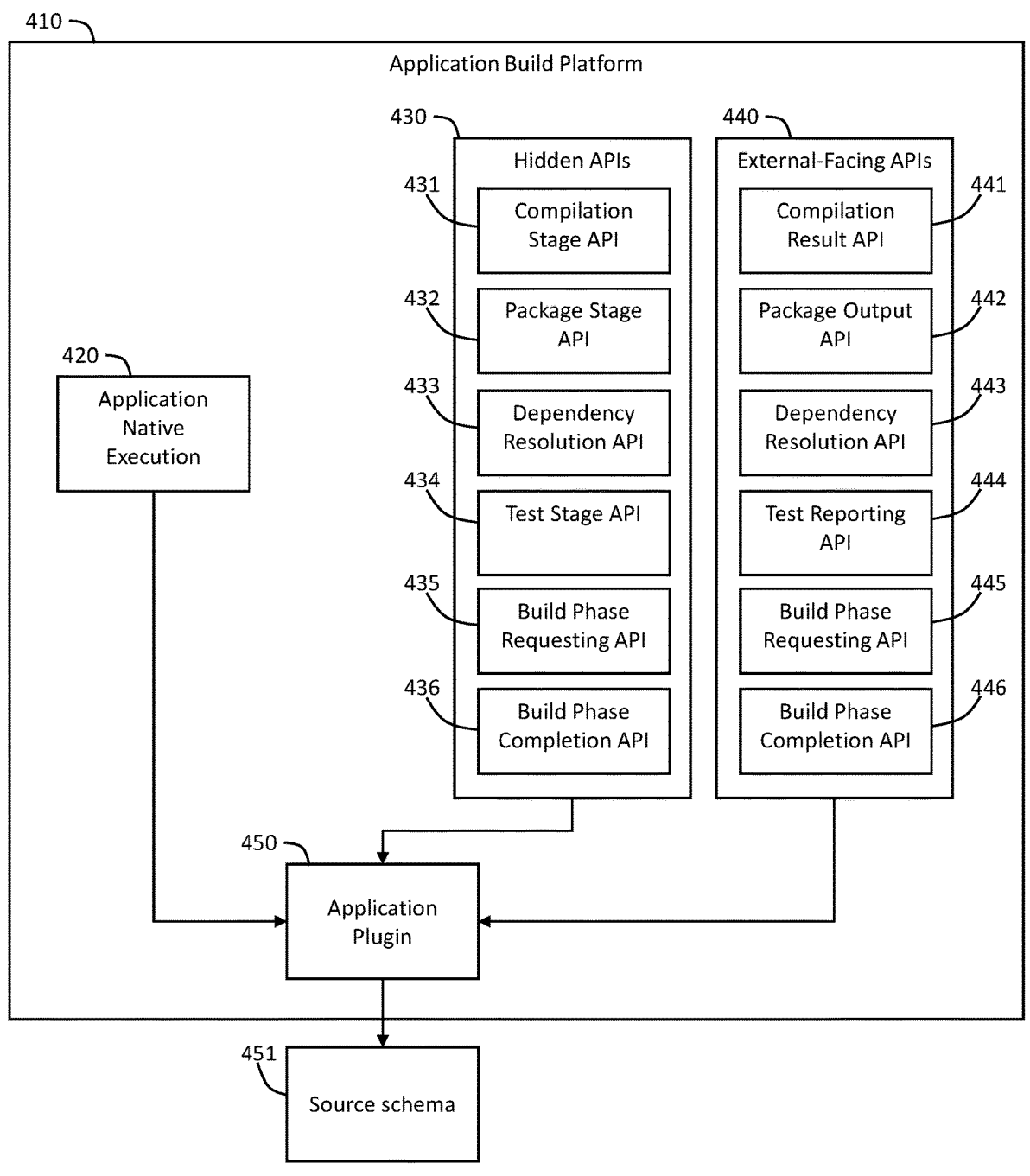
FIG. 4 illustrates an example of an application plugin generating a source schema according to one or more embodiments.

FIG. 4 illustrates an example embodiment of an application plugin 450 generating a source schema 451 based on hidden APIs 430 and external-facing APIs 440. The application plugin 450 runs on the application build platform 410 to monitor a build process for a particular application. For example, the application build platform 410 may both perform a build process to build the application and also run a native execution of the application 420 to allow for running and monitoring the run-time application in a controlled environment. The application plugin 450 may analyze the native execution of the application 420 to identify data generated during the execution.

The application plugin 450 analyzes APIs associated with the build to identify data available associated with the build. In the example illustrated in FIG. 4, the APIs include hidden API's 430 and external-facing API's 440. External-facing API's 440 include API's that may be accessed by applications external to the application build platform 410. For example, a user may write code to execute a series of API calls upon completion of different build stages. The API calls may result in the application build platform 410 returning data, such as reports, specifying results of the build phases. The external-facing API's 440 include a compilation result API 441 including functions to generate data describing a result of a compilation of source code. A package output API 442 includes functions to generate data describing one or more objects resulting from packaging compiled code. A dependency resolution API 443 includes functions to generate data describing whether dependencies described in the source code may be successfully satisfied. For example, the dependency resolution API 443 may indicate that a particular dependency could not be satisfied because the program referred to in the compiled source code was not found at a specified location. A test reporting API 444 includes functions to generate data describing test results of compiled source code. For example, the test results may specify whether the compiled code performs according to specifications. A build phase requesting API 445 includes functions to generate data describing parameters associated with a requested build. A build phase completion API 446 includes functions to generate data describing a success or failure of a build process.

The hidden API's 430 include API's that are not accessible to applications, programs, and users external to the application build platform 410. For example, an application packaging software module, which includes logic and software to perform a packaging build process, may perform one or more calls to a hidden compilation result API 431 to obtain data that may not be accessible to external applications. Examples of data that may not be accessible to external applications include addresses in memory of particular data structures, data describing particular security parameters, such as passwords and security identification numbers, confidential user information, hardware and/or software codes associated with particular errors or exceptions, and communication protocol information. The hidden APIs include a compilation stage API 431, a package stage API 432, a dependency resolution API 433, a test stage API 434, a build phase requesting API 435, and a build phase completion API 436.

The application plugin 450 analyzes the hidden API's 430 and the external-facing API's 440 to identify data returned by API functions. The application plugin 450 identifies types of data returned, naming conventions of data returned, attributes of the data returned (such as the content described by the data and the size of the data), and locations where returned data is stored. The application plugin 450 analyzes native execution of the application 420 on the application build platform 410 to identify data generated during execution of the application. Based on the data identified by the API's 430 and 440 and the native execution of the application 420, the application plugin 450 generates a source schema 451. The source schema 451 describes the data generated by the application build platform 410 and the native execution of the application 420. The source schema 451 specifies attributes of the data, including: (a) an API call that may be used to generate the data, (b) a type of the data, (c) a size of the data, (d) naming conventions of the data, (e) a sample rate of the data, and (f) where the data is stored.

Figure 5:
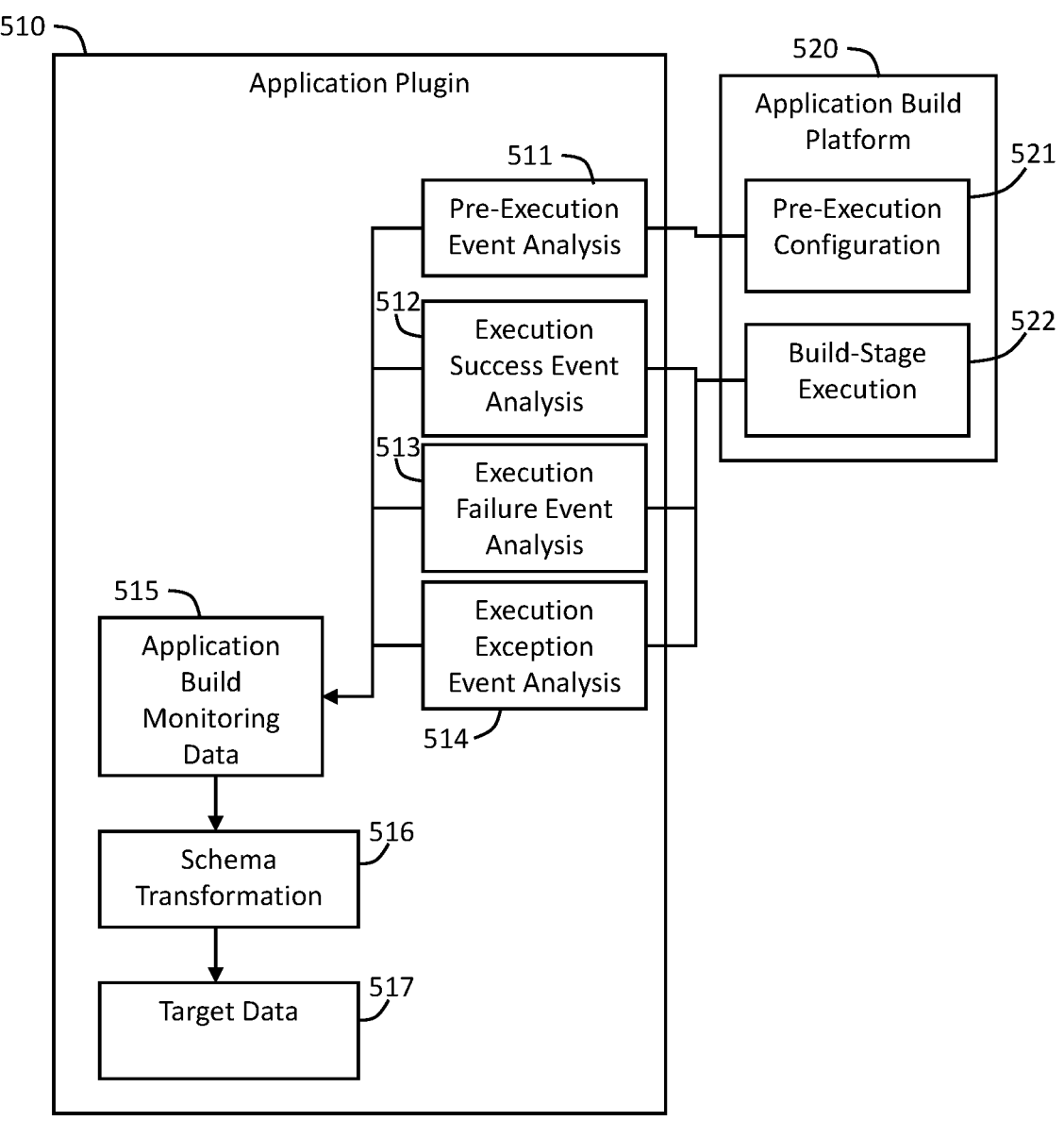
FIG. 5 illustrates an example of an application plugin generating a set of target data according to one or more embodiments.

FIG. 5 is an example embodiment of an application plugin 510 running in parallel with an application build platform 520. The application build platform 520 executes a series of build stages, such as stages 152-156 illustrated in FIG. 1B. For each stage, the application build platform 520 performs a pre-execution configuration 521 and a build-stage execution 522. For example, the application build platform 520 performs a pre-execution configuration 521 for configuring resources prior to performing a compilation stage execution by (a) obtaining a location of source code to be compiled, performing any pre-compilation checks on the source code to ensure the source code is of a correct type and format for compilation, and (c) assigning processing resources to the compilation process. Subsequent to the pre-execution configuration, the application build platform 520 performs the build-stage execution 522 by using the assigned processing resources to compile the specified source code.

The application plugin 510 monitors the pre-execution configuration process 521 and the execution process 522 to generate build data. For example, the application plugin 510 performs pre-execution event analysis 511 of the pre-execution configuration process 521. The application plugin 510 performs execution success event analysis 512, execution failure event analysis 513, and execution exception event analysis 514 based on the build-stage execution 522 performed by the application build platform 520.

The application plugin 510 may perform the pre-execution analysis 511 and event analysis 512-514 based on performing API calls to APIs associated with the particular build stage, as illustrated in FIG. 4. The application plugin 510 generates a set of application build monitoring data 515 from the pre-execution event analysis 511, execution success event analysis 512, execution failure event analysis 513, and execution exception event analysis 514. The application plugin 510 applies the data 515 to a schema transformation 516 to generate a set of target data 517. The application plugin 510 applies the set of target data 517 to a machine learning model to generate recommendations for modifying parameters of one or both of the pre-execution configuration 521 and the build-stage execution 522.

6. Computer Networks and Cloud Networks

In one or more embodiments, an application build platform is implemented on a computer network. A computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, multiple tenants may share the database.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
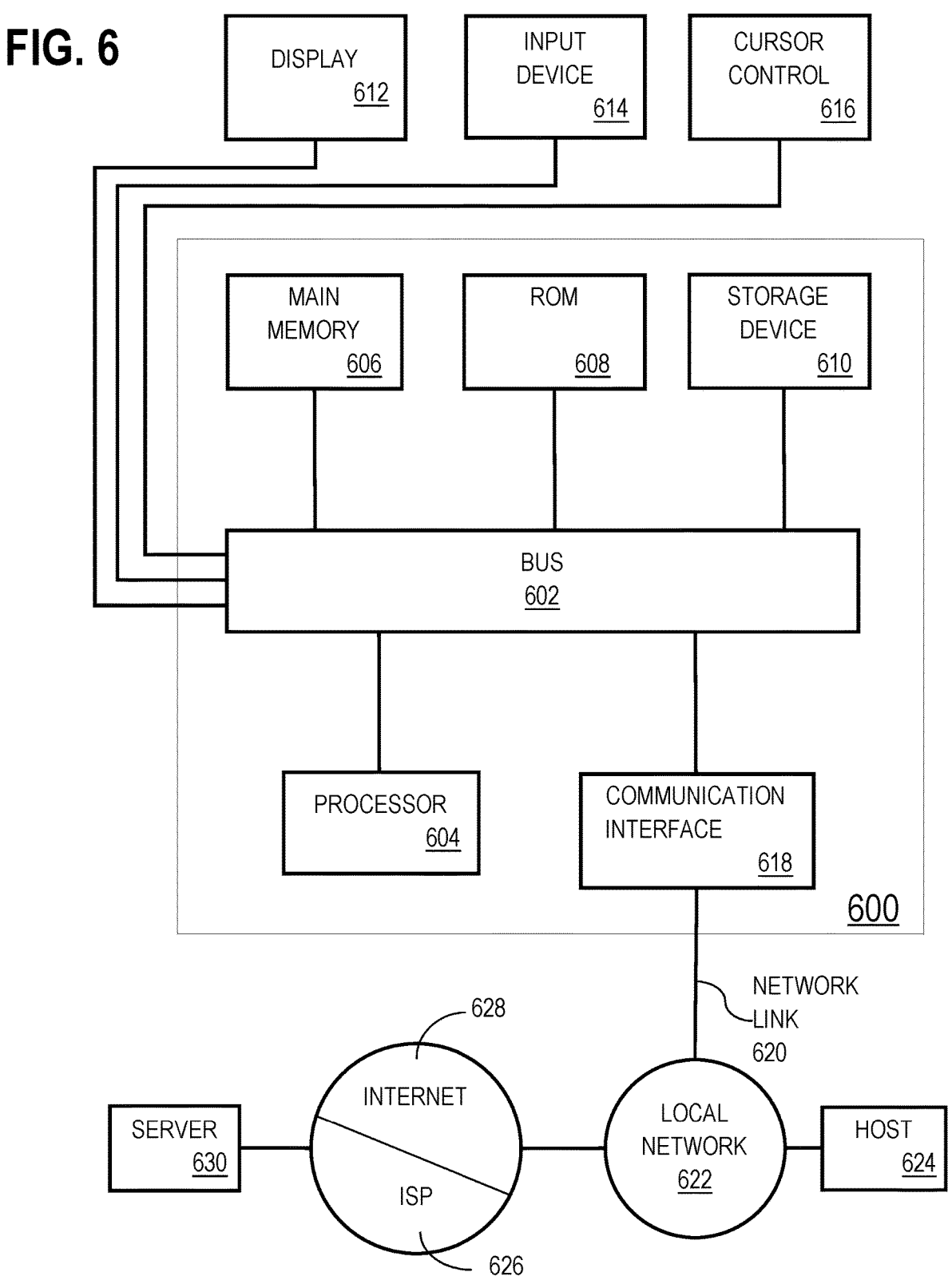
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

executing a first application in a computing environment using a set of computing resources;

based on executing the first application in the computing environment, generating a first dataset associated with at least one of (a) performance of the first application, and (b) the set of computing resources used to execute the first application;

analyzing, by an application plugin, features of a first application-internal module of a first application to detect characteristics of a first dataset generated by the first application-internal module, wherein the first dataset is accessible by a second application-internal module of the first application, and wherein the first dataset is inaccessible by a second application that is external to the first application;

based on the characteristics of the first dataset, determining, by the application plugin, whether the first dataset comprises values associated with a field of a target database schema;

responsive to determining that the first dataset comprises values associated with the field of the target database schema:

transforming the first dataset to generate a second dataset formatted in accordance with the target database schema, at least by transforming one or more of formatting, size, sample rate, naming convention, and attributes of the first dataset in accordance with the target database schema; and configuring the second dataset, that has been generated by transforming the first dataset, for access by the second application at least by: generating, by the application plugin, a plugin output comprising or referencing the second dataset formatted in accordance with the target database schema, wherein the second application accesses the second dataset.

2. The non-transitory computer readable medium of claim 1, wherein the operations further comprise computing the target database schema based on specifications associated with one or more machine learning models.

3. The non-transitory computer readable medium of claim 1, wherein the operations further comprise computing the target database schema based on information required by each of two or more machine learning models.

4. The non-transitory computer readable medium of claim 1, wherein analyzing the features of the first application-internal module to detect the characteristics of the first dataset generated by the first application-internal module comprises traversing a private Application Programming Interface (API) that is accessible to other application-internal modules of a same application, including the second application-internal module, but not accessible to external application modules comprised in other applications, including the second application, and wherein traversing the private API comprises detecting metadata describing the values returned by the private API and a data type of the values.

5. The non-transitory computer readable medium of claim 1, wherein the operations further comprise:

transmitting, by the application plugin, the plugin output to the second application, wherein the second application is in a same security environment as the first application, and wherein the first application transmits the plugin output to the second application without exposing the plugin output to external applications outside the security environment.

6. The non-transitory computer readable medium of claim 1, wherein analyzing, by the application plugin, the features of the first application-internal module includes monitoring an execution state of the first application-internal module, and wherein the values are extracted from different execution states during execution of the first application-internal module.

7. The non-transitory computer readable medium of claim 1, wherein the first application-internal module is a module that transmits data only to other modules of the first application, without transmitting data to modules comprised in other applications, including the second application.

8. The non-transitory computer readable medium of claim 1, wherein the operations further comprise:

receiving, by the application plugin, configuration information that is generated by a machine learning model based on the plugin output; and modifying a configuration associated with the first application based on the configuration information.

9. The non-transitory computer readable medium of claim 1, wherein the operations further comprise:

transforming, by a second instance of the application plugin, a third dataset to a fourth dataset formatted in accordance with the target database schema, wherein the second dataset and the fourth dataset correspond to a same target schema, and wherein the first dataset and the third dataset correspond to different schemas, and wherein a first function for transforming first dataset to the second dataset is different than a second function for transforming third dataset to the fourth dataset.

10. The non-transitory computer readable medium of claim 1, wherein the operations further comprise:

modifying characteristics of the first application at runtime, by the application plugin, based on data detected by the application plugin.

11. A method comprising:

executing a first application in a computing environment using a set of computing resources;

based on executing the first application in the computing environment, generating a first dataset associated with at least one of (a) performance of the first application, and (b) the set of computing resources used to execute the first application;

analyzing, by an application plugin, features of a first application-internal module of a first application to detect characteristics of a first dataset generated by the first application-internal module, wherein the first dataset is accessible by a second application-internal module of the first application, and wherein the first dataset is inaccessible by a second application that is external to the first application;

based on the characteristics of the first dataset, determining, by the application plugin, whether the first dataset comprises values associated with a field of a target database schema;

responsive to determining that the first dataset comprises values associated with the field of the target database schema:

transforming the first dataset to generate a second dataset formatted in accordance with the target database schema, at least by transforming one or more of formatting, size, sample rate, naming convention, and attributes of the first dataset in accordance with the target database schema; and configuring the second dataset, that has been generated by transforming the first dataset, for access by the second application at least by: generating, by the application plugin, a plugin output comprising or referencing the second dataset formatted in accordance with the target database schema, wherein the second application accesses the second dataset.

12. The method of claim 11, further comprising: computing the target database schema based on specifications associated with one or more machine learning models.

13. The method of claim 11, further comprising: computing the target database schema based on information required by each of two or more machine learning models.

14. The method of claim 11, wherein analyzing the features of the first application-internal module to detect the characteristics of the first dataset generated by the first application-internal module comprises traversing a private Application Programming Interface (API) that is accessible to other application-internal modules of a same application, including the second application-internal module, but not accessible to external application modules comprised in other applications, including the second application, and wherein traversing the private API comprises detecting metadata describing the values returned by the private API and a data type of the values.

15. The method of claim 11, further comprising:

transmitting, by the application plugin, the plugin output to the second application, wherein the second application is in a same security environment as the first application, and wherein the first application transmits the plugin output to the second application without exposing the plugin output to external applications outside the security environment.

16. The method of claim 11, wherein analyzing, by the application plugin, the features of the first application-internal module includes monitoring an execution state of the first application-internal module, and wherein the values are extracted from different execution states during execution of the first application-internal module.

17. The method of claim 11, wherein the first application-internal module is a module that transmits data only to other modules of the first application, including the second application-internal module, without transmitting data to modules comprised in other applications, including the second application.

18. A system comprising:

one or more processors; and memory storing instructions that, when executed by the one or more processors, cause the system to perform:

executing a first application in a computing environment using a set of computing resources;

based on executing the first application in the computing environment, generating a first dataset associated with at least one of (a) performance of the first application, and (b) the set of computing resources used to execute the first application;

analyzing, by an application plugin, features of a first application-internal module of a first application to detect characteristics of a first dataset generated by the first application-internal module, wherein the first dataset is accessible by a second application-internal module of the first application, and wherein the first dataset is inaccessible by a second application that is external to the first application;

based on the characteristics of the first dataset, determining, by the application plugin, whether the first dataset comprises values associated with a field of a target database schema;

responsive to determining that the first dataset comprises values associated with the field of the target database schema:

transforming the first dataset to generate a second dataset formatted in accordance with the target database schema, at least by transforming one or more of formatting, size, sample rate, naming convention, and attributes of the first dataset in accordance with the target database schema; and configuring the second dataset, that has been generated by transforming the first dataset, for access by the second application at least by: generating, by the application plugin, a plugin output comprising or referencing the second dataset formatted in accordance with the target database schema, wherein the second application accesses the second dataset.

\* \* \* \* \*